Feb. 17, 1948.   F. E. SNEDECOR   2,436,183
CABIN PRESSURE REGULATOR
Filed June 25, 1946
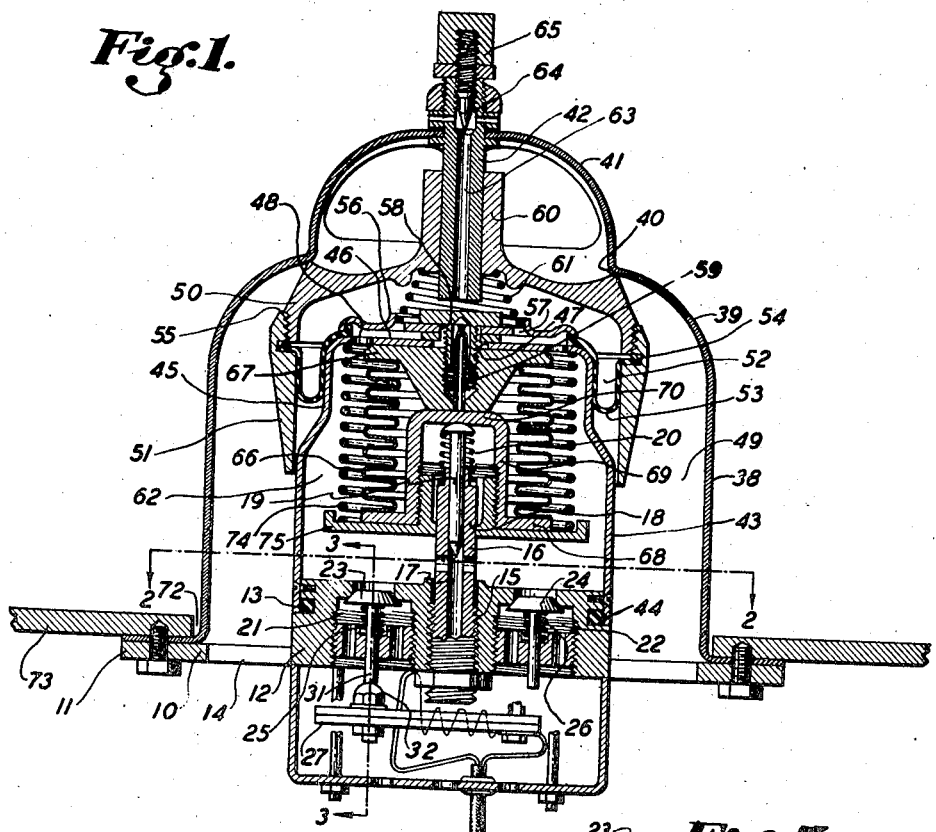
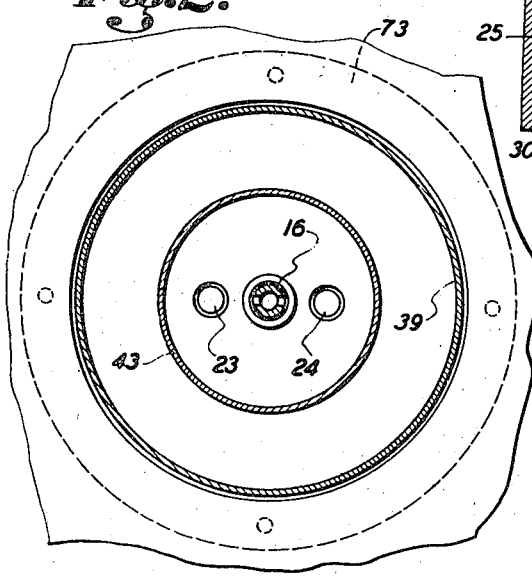
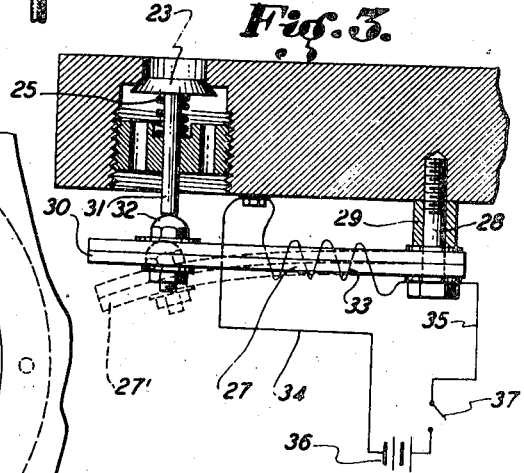
INVENTOR.
FRANK E. SNEDECOR
BY
ATTORNEY Patented Feb. 17, 1948

2,436,183

UNITED STATES PATENT OFFICE 2,436,183

CABIN PRESSURE REGULATOR

Frank E. Snedecor, Los Angeles, Calif., assignor to The Garrett Corporation, Los Angeles, Calif., a corporation of California Application June 25, 1946, Serial No. 679,179

12 Claims. (Cl. 98—1.5)

My invention relates in general to pressure regulators for controlling pressures in enclosures, and relates in particular to a pressure regulator of simple form especially adapted for the regulation of air pressure in aircraft cabins in accordance with a predetermined schedule relation to the pressure of the ambient atmosphere in which the aircraft is flown.

It is an object of the invention to provide a pressure regulator of simple and compact form which will give long and efficient service owing to its simplicity of construction and the simplicity of the automatic and selective control parts incorporated therein.

It is an object of the invention to provide a regulator for connection to the air outlet opening of an aircraft cabin into which a flow of air is fed from a separate air pressure source, this regulator controlling the outflow of air from the cabin so that the cabin pressure remains the same as atmospheric pressure until a predetermined altitude has been reached, is maintained at a substantially constant pressure between that altitude and a second predetermined higher altitude, above which higher altitude the cabin pressure is maintained at predetermined differential pressures above altitude or ambient pressures.

It is an object of the invention to provide a regulator of the character described in the preceding paragraph having simple means whereby the pressure differential maintained between cabin pressure and ambient altitude pressure may be varied between high and low limits. In this respect, the invention is especially valuable with combat military aircraft, making it possible for the personnel of the aircraft to reduce the cabin pressure during combat, thereby minimizing the dangers of explosive decompression of personnel which may result from puncture of the cabin walls by enemy action.

It is an object of the invention to provide a pressure regulator of the character herein set forth having a high differential pressure control and a low differential pressure control, with a remote electrically actuated control operative to render active the normally inactive low differential control of the regulator, thereby making it possible for a pilot to reduce the cabin-ambient atmosphere pressure differential from its normal high value to a lower value when the pilot takes the plane into combat.

A further object of the invention is to provide a device of the character set forth in the preceding paragraph having a control chamber and also having a pressure differential valve and a temperature responsive element arranged so that when it is unheated, it will hold this pressure differential valve closed and when heated, will move away from the valve and permit the same to function. In the preferred practice of this invention, a second pressure differential valve is provided for the control chamber for limiting the maximum pressure differential producable therein with relation to the ambient atmosphere.

Further objects and advantages of the invention will be brought out in the following part of the specification.

Referring to the drawings which are for illustrative purposes only,

Fig. 1 is a sectional view through a preferred embodiment of the invention.

Fig. 2 is a section to reduced scale taken as indicated by the line 2—2 of Fig. 1.

Fig. 3 is a fragmentary sectional view taken as indicated by the line 3—3 of Fig. 1 to show the manner in which the bi-metallic thermostat of the device is supported.

The preferred embodiment of the invention shown in Fig. 1 includes a supporting member 10 having an outer wall 11 in the form of a radial flange, an inner wall 12 of circular form having in its peripheral wall portion an annular channel 13, and radial webs 14 to connect the outer and inner walls 11 and 12. The inner wall 12 has an axial threaded opening 15 to receive an outlet bleed tube 16 which provides a bleed duct 17 and a guide 18 for a valve closure 19 of pin form, adapted to cooperate with the immersed end of the duct 17. This closure 19 is held in raised position by a spring 20.

The wall 12 has therein low and high pressure differential valve passages 21 and 22 having outwardly faced seats arranged to be engaged by low differential and high differential valves 23 and 24 respectively. The valves 23 and 24 are urged toward closed position by springs 25 and 26 proportioned so that the valve 23 will open at a lower pressure than the valve 24.

In the invention we provide means for controlling the action of the differential valve 23, so that this valve 23 may be rendered active or inactive. The means for controlling the valve 23 is electrically actuated so that it may be controlled from a remote position, and consists of a bi-metallic element 27 supported adjacent the lower face of the inner wall 12 by a screw 28 and spacer 29 so that its opposite or free end 30 will extend across the lower end of the stem 31 of the valve 23. When the bi-metallic element 27 is unheated, the head of a screw 32 carried at the free end 30 thereof presses upwardly against the lower end of the valve stem 31 with a force somewhat greater than the pressure of the spring 25 so that the closure 23 is held closed by a force of such magnitude that the valve 23 will not be opened by pressure against its upper face at least as great as or greater than the pressure required against the upper face of the valve 24 to open the same against the pressure of its spring 26 and fluid pressure exerted against the lower face of the valve 24. The bi-metallic element 27, when heated, will flex as indicated by dotted lines 27' so as to carry the free end 30 thereof downward away from the stem 31 of the valve 23, thereby removing the holding pressure which the element 27 previously exerted against the valve 23. For heating the element 27 so as to cause the same to flex toward the position indicated at 27', a resistance heating element or coil 33 is disposed therearound as is indicated schematically in Fig. 3, conductors 34 and 35 are connected to the opposite ends of the resistance element 33, whereby this element 33 may be connected in series with a source of electrical energy shown as a battery 36 when a control switch 37 is closed.

As shown in Fig. 1, an outer shell 38 is extended upwardly from the outer wall 11 of the supporting member 10, the upper portion 39 of this outer shell 38 being curved inwardly so as to define a valve port 40 which is coaxial with the wall 12 and is approximately the same diameter as the inner wall 12. The outer shell 38 is formed from a relatively light metal and above the port 40 has a perforate dome shaped superstructure 41 providing openings through which air may pass to the port 40. The superstructure 41 supports an inlet bleed tube 42 in axial alignment with the bleed tube 16 and positioned so as to extend through the port 40.

An inner shell 43 is disposed within the outer shell 38, the lower portion of this inner shell 43 surrounding the upper peripheral part of the inner wall 12 and covering the annular channel 13 in which a sealing ring 44 is placed. The upper part of the inner shell 43 comprises a diametrally reduced cylindrical wall portion 45 and a top wall 46 having a central opening 47 and several smaller openings 48 between the opening 47 and the periphery of the top wall 46. The inner shell 43 cooperates in forming within the outer shell 38 an air passage 49 which communicates with the port 40.

An inverted cup-shaped closure 50 for the port 40 is disposed in the upper part of the outer shell 38 and above the inner shell 43. A skirt 51 is threaded onto the peripheral or lip portion of the closure 50 and projects down over the diametrally reduced upper wall portion 45 of the inner shell 43 so as to define therearound an annular cavity 52 which receives a diaphragm 53. The peripheral lip 54 of this diaphragm 53 is clamped between the closure 50 and its skirt 51. The inner annular portion 55 of the diaphragm 53 extends over the peripheral portion of the top wall 46 of the shell 43 and is clamped thereagainst by a formed plate 56 having air openings 57 and a central opening 58 for passage of a screw 59 which passes through the opening 47 in the top wall 46 of the shell 43 to receive pressure whereby the peripheral portion of the plate 56 may clamp the inner annular portion 55 of the diaphragm 53 tightly against the peripheral portion of the upper wall 46. The closure 50 has an upwardly projecting perforated boss 60 which is vertically slidable on the guide means provided by the inlet bleed tube 42. A relatively light spring 61, disposed between the upper face of the plate 56 and the lower face of the closure 50, urges the closure 50 toward its closed position across the mouth of the port 40.

The inner shell 43, the wall of the closure 50, and the diaphragm 53 define a control chamber 62, the upper and lower portions of which communicate through the openings 48 in the wall 46 and the openings 57 in the diaphragm clamping plate 56. The inlet tube 42 provides an inlet bleed duct 63 communicating with the upper portion of the control chamber 62. The flow of air through this inlet bleed duct 63 is controlled by a needle valve 64 which is threaded into the upper end of the inlet bleed tube 42 and, when properly adjusted, is locked in place by nut means 65.

The pressure in the control chamber 62 acts to force the closure 50 toward the port 40, and therefore determines the pressure of fluid surrounding the outer shell 38 required to displace the closure 50 downwardly (outwardly) so that air may flow through the port and out through the air passage 49 of the regulator. The pressure in the control chamber 62 is determined by the flow capacities of the inlet and outlet bleed ducts 63 and 17 and also by the differential valves 23 and 24. The relationship between the flow capacities of the bleed ducts 63 and 17 is varied by the valve pin 19 which is moved by a means responsive to pressure in the control chamber 62. This pressure responsive means comprises an evacuated bellows 66 having an upper end wall 67 and a lower end wall 68, the upper end wall 67 being secured to the lower face of the top wall 46 of the inner shell 43 and the lower end wall 68 being secured to a cup-shaped retainer 75 for bellows spring 74, said retainer being slidable on the upper end of the outlet bleed tube 16. The lower end wall 68 includes an inverted cup 69 having an end wall 70 which engages the head of the pin 19.

The regulator may be secured in an opening 72 in a wall 73 so that the exterior of the shell 38 will be exposed to pressure in an aircraft cabin and so that the passage 49 will be exposed to ambient atmosphere externally of the cabin. When the aircraft employing the regulator is situated at a low level—for example, near sea level—the pressure in the control chamber 62 will be substantially that of the ambient atmosphere, owing to the free communication of the control chamber 62 with ambient atmosphere through the outlet bleed passage 17. Therefore, the pressures on opposite sides of the closure 50 will be substantially balanced and will require a very small increase in cabin pressure to move the closure 50 away from the port 40 against the force of the spring 61. At this time the bellows 66 will be collapsed against the expansive force of the spring 74 by the substantially ambient atmosphere in the control chamber 62, with the result that the closure pin 19 will be maintained in the raised position in which it is shown. Under these conditions, the supercharger which is forcing air into the cabin will merely serve to circulate air through the cabin, for the reason that the outflow of air from the cabin through the port 40 will be substantially unrestricted. As the elevation or altitude of the aircraft is increased, the reduction in the pressure of the ambient atmosphere will be accompanied by a reduction in the pressure in the cabin owing to the fact that the closure 50 will furnish substantially no restriction to the outlet of air through the port 40, and there will be a like reduction in pressure in the control chamber 62. This reduction in pressure in the control chamber 62 will be accompanied by a gradual expansion of the bellows 66 augmented by the expansive force of the spring 74 so that the closure pin 19 will be gradually moved downward from the position in which it is shown in Fig. 1 toward a position to restrict the outflow of air through the outlet bleed duct 17 at the beginning of the isobaric range of control of the regulator, for example, at an ambient atmosphere of about 8000 feet above sea level. Thereafter, as the elevation of the aircraft is increased, the reduction in the ambient atmosphere pressure will tend to increase the outflow of air from the cabin and from the control chamber 62 through the outlet bleed duct 17, but at this time the expansion of the bellows 66 will cause a restriction of the outflow of air through the outlet duct 17 so as to produce an increase in pressure in the control chamber by the air which is flowing thereinto through the inlet bleed duct 63. This increase in pressure in the control chamber 62 will act against the lower face of the closure 50 to urge the closure toward the port 40 and restrict the flow of air from the cabin through the port 40 in a manner to maintain a substantially constant pressure throughout the isobaric pressure range. It will be perceived, accordingly, that due to the lowering of the ambient atmospheric pressure as the altitude of the aircraft is increased, there will be a gradual increase in the cabin-ambient-atmosphere pressure differential and also an increase in the control chamber-ambient-atmosphere differential.

The strength of the spring 25 which closes the low pressure differential valve 23 may be established at a value wherein the spring 25 will permit the valve 23 to open in response to a control chamber-ambient-atmosphere pressure differential corresponding to a cabin-ambient-atmosphere pressure differential of relatively small value, for example, two and three-quarters pound, and the spring 26 may be of such strength that the high differential pressure valve 24 will open when the control chamber-ambient-atmosphere pressure differential reaches a value corresponding to the maximum cabin-ambient-atmosphere pressure differential prescribed for the aircraft cabin is reached. However, the low pressure differential valve 23 is held closed by the bi-metallic element 27 under normal conditions of flight, so that isobaric pressure will be maintained in the cabin until the maximum pressure differential prescribed by the spring 26 of the maximum pressure differential valve 24 is reached. Thereafter, the maximum pressure differential between the cabin and the atmospheric pressure will be maintained as the altitude of the aircraft is increased. However, the pilot, or another member of the aircraft personnel, may close the switch 37, or may perform some act which will cause this switch 37 to automatically close, whereupon current from the source 36 will pass through the heating element 33 of the bi-metallic element 27 and cause the same to release its holding pressure from the low pressure differential valve 23, whereupon the pressure in the control chamber 62 will bleed from the control chamber 62 through the passage 21 until the low pressure differential prescribed by the spring 25 is reached. This reduced control chamber-ambient atmosphere pressure differential will result in an increase in the cabin-control chamber pressure differential which acts upon the valve closure 50, causing a readjustment of the closure 50 and an increased and controlled flow of air out through the port 40 will establish a lower cabin-ambient atmosphere pressure differential throughout the time the low differential pressure valve 23 is rendered active by the retraction of the bi-metallic element 27.

I claim as my invention:

1. In a pressure regulator of the character described, the combination of: a supporting member having an inner wall with a pressure differential valve passage therethrough, and an outer wall; an outer shell extending from said outer wall and defining an air valve port; an inner shell extending from said inner wall so as to form within said outer wall a passage communicating with said port; a valve closure for said port movably supported on and in sealed relation to said inner shell so as to form a control chamber, air pressure in which tends to move said closure toward said port; an air inlet bleed tube supported by said outer shell and extending through said closure, the inner end of said tube communicating with said control chamber; means forming an outlet bleed passage extending from said control chamber through said inner wall; means responsive to pressure in said control chamber for controlling the flow of air through said outlet bleed passage to change the pressure in said control chamber; a differential valve closure for said pressure differential valve passage having its inwardly presented face exposed to the pressure in said control chamber; spring means urging said differential valve closure toward its closed position; holding means active to hold said differential valve closure in closed position with a force greater than that which is exerted by said spring means; and means for rendering said holding means inactive.

2. In a pressure regulator of the character described, the combination of: a supporting member having an inner wall with a pressure differential valve passage therethrough, and an outer wall; an outer shell extending from said outer wall and defining an air valve port; an inner shell extending from said inner wall so as to form within said outer wall a passage communicating with said port; a valve closure for said port movably supported on and in sealed relation to said inner shell so as to form a control chamber, air pressure in which tends to move said closure toward said port; an air inlet bleed tube supported by said outer shell and extending through said closure, the inner end of said tube communicating with said control chamber; means forming an outlet bleed passage extending from said control chamber through said inner wall; means responsive to pressure in said control chamber for controlling the flow of air through said outlet bleed passage to change the pressure in said control chamber; a differential valve closure for said pressure differential valve passage having its inwardly presented face exposed to the pressure in said control chamber; spring means urging said differential valve closure toward its closed position; holding means active to hold said differential valve closure in closed position with a force greater than that which is exerted by said spring means; means for rendering said holding means inactive; and a differential pressure valve means connecting said control chamber with ambient atmosphere pressure for limiting the maximum pressure differential between said control chamber and said ambient atmosphere pressure.

3. In a pressure regulator of the character described, the combination of: a supporting member having an inner wall with a pressure differential valve passage therethrough, and an outer wall; an outer shell extending from said outer wall and defining an air valve port; an inner shell extending from said inner wall so as to form within said outer wall a passage communicating with said port; a valve closure for said port movably supported on and in sealed relation to said inner shell so as to form a control chamber, air pressure in which tends to move said closure toward said port; an air inlet bleed tube supported by said outer shell and extending through said closure, the inner end of said tube communicating with said control chamber; means forming an outlet bleed passage extending from said control chamber through said inner wall; means responsive to pressure in said control chamber for controlling the flow of air through said outlet bleed passage to change the pressure in said control chamber; a differential valve closure for said pressure differential valve passage having its inwardly presented face exposed to the pressure in said control chamber; spring means urging said differential valve closure toward its closed position; a temperature responsive element placed so that when it is unheated it will hold said differential valve closure in closed position; electrical means operative to heat said temperature responsive element so that it will release said differential valve closure; and a differential pressure valve means connecting said control chamber with ambient atmosphere pressure for limiting the maximum pressure differential between said control chamber and said ambient atmosphere pressure.

4. In a pressure regulator of the character described, the combination of: a supporting member having an inner wall with a pressure differential valve passage therethrough, and an outer wall; an outer shell extending from said outer wall and defining an air valve port; an inner wall and defining an air valve port; an inner shell extending from said inner wall so as to form within said outer wall a passage communicating with said port; a valve closure for said port movably supported on and in sealed relation to said inner shell so as to form a control chamber, air pressure in which tends to move said closure toward said port; an air inlet bleed tube supported by said outer shell and extending through said closure, the inner end of said tube communicating with said control chamber; means forming an outlet bleed passage extending from said control chamber through said inner wall; means responsive to pressure in said control chamber for controlling the flow of air through said outlet bleed passage to change the pressure in said control chamber; a differential valve closure for said pressure differential valve passage having its inwardly presented face exposed to the pressure in said control chamber; spring means urging said differential valve closure toward its closed position; a bi-metallic element placed so that when it is unheated it will hold said differential valve closure in closed position and so that when it is heated, it will flex away from said differential valve closure; electrical means operative to heat said bi-metallic element so that it will release said differential valve closure; and a differential pressure valve means connecting said control chamber with ambient atmosphere pressure for limiting the maximum pressure differential between said control chamber and said ambient atmosphere pressure.

5. In a mechanism for controlling the flow of fluid from a zone of higher pressure to a zone of lower pressure, the combination of: a passage connecting said chambers; walls forming a control chamber having an inlet bleed duct communicating with said zone of higher pressure and an outlet bleed duct communicating with said zone of lower pressure; means sensitive to the pressure in said control chamber for varying the flow of fluid through at least one of said bleed ducts to vary the pressure in said control chamber; a valve closure for said passage connected to said control chamber so that it will be moved toward a position to close said passage in response to an increase in pressure in said control chamber; a differential pressure valve means connecting said control chamber with ambient atmosphere pressure for limiting the maximum pressure differential between said control chamber and said ambient atmosphere pressure; and electrically actuated means for controlling the actuation of said differential pressure valve means.

6. In a mechanism for controlling the flow of air from an aircraft cabin, the combination of: means forming a passage for the outlet of air from said cabin; an outwardly opening valve to control the escape of air through said passage; walls cooperating with the outer face of said valve to form a control chamber in which air pressure may act to close said valve; duct means for conducting air into and out of said control chamber; valve means for controlling the flow of air through at least one of said duct means whereby the pressure in said control chamber will be varied; control means sensitive to pressure in said control chamber for controlling the position of said valve means; pressure differential means for limiting the pressure differential which may be produced between the interior and the exterior of said control chamber; and electrically actuated means for controlling the operation of said pressure differential means.

7. In a mechanism for controlling the flow of air from an aircraft cabin, the combination of: means forming a passage for the outlet of air from said cabin; an outwardly opening valve to control the escape of air through said passage; walls cooperating with the outer face of said valve to form a control chamber in which air pressure may act to close said valve; duct means for conducting air into and out of said control chamber; valve means for controlling the flow of air through at least one of said duct means whereby the pressure in said control chamber will be varied; control means sensitive to pressure in said control chamber for controlling the position of said valve means; high pressure and low pressure differential means for limiting the pressure differential which may be produced between the interior and the exterior of said control chamber; and electrically actuated means for controlling the operation of said low pressure differential means.

8. In a mechanism for controlling the flow of air from an aircraft cabin, the combination of: means forming a passage for the outlet of air from said cabin; an outwardly opening valve to control the escape of air through said passage; walls cooperating with the outer face of said valve to form a control chamber in which air pressure may act to close said valve; duct means for conducting air into and out of said control chamber; valve means for controlling the flow of air through at least one of said duct means whereby the pressure in said control chamber will be varied; control means sensitive to pressure in said control chamber for controlling the position of said valve means; a high pressure differential valve means connecting the interior of said control chamber with a zone which is connected with the ambient atmosphere; a low pressure differential valve means connecting the interior of said control chamber with a zone which is connected with the ambient atmosphere; and electrically actuated means for controlling the operation of said low pressure differential valve means.

9. In a mechanism for controlling the flow of air from an aircraft cabin, the combination of: means forming a passage for the outlet of air from said cabin; an outwardly opening valve to control the escape of air through said passage; walls cooperating with the outer face of said valve to form a control chamber in which air pressure may act to close said valve; duct means for conducting air into and out of said control chamber; valve means for controlling the flow of air through at least one of said duct means whereby the pressure in said control chamber will be varied; control means sensitive to pressure in said control chamber for controlling the position of said valve means; a high pressure differential valve means connecting the interior of said control chamber with a zone which is connected with the ambient atmosphere; a low pressure differential valve means connecting the interior of said control chamber with a zone which is connected with the ambient atmosphere; holding means operating to hold said low pressure differential valve means closed; and electrically actuated mean for rendering said holding means ineffective so that said low pressure differential valve means can function.

10. In a mechanism for controlling the flow of air from an aircraft cabin, the combination of: means forming a passage for the outlet of air from said cabin; an outwardly opening valve to control the escape of air through said passage; walls cooperating with the outer face of said valve to form a control chamber in which air pressure may act to close said valve; duct means for conducting air into and out of said control chamber; valve means for controlling the flow of air through at least one of said duct means whereby the pressure in said control chamber will be varied; control means sensitive to pressure in said control chamber for controlling the position of said valve means; a high pressure differential valve means connecting the interior of said control chamber with a zone which is connected with the ambient atmosphere; a low pressure differential valve means connecting the interior of said control chamber with a zone which is connected with the ambient atmosphere; a temperature responsive element disposed so that when it is unheated it will hold said low pressure valve means closed and so that it will release said low pressure differential valve means when it is heated; and means for heating said temperature responsive element.

11. In a mechanism for controlling the flow of air from an aircraft cabin, the combination of: means forming a passage for the outlet of air from said cabin; an outwardly opening valve to control the escape of air through said passage; walls cooperating with the outer face of said valve to form a control chamber in which air pressure may act to close said valve; duct means for conducting air into and out of said control chamber; valve means for controlling the flow of air through at least one of said duct means whereby the pressure in said control chamber will be varied; control means sensitive to pressure in said control chamber for controlling the position of said valve means; a high pressure differential valve means connecting the interior of said control chamber with a zone which is connected with the ambient atmosphere; a low pressure differential valve means connecting the interior of said control chamber with a zone which is connected with the ambient atmosphere; a bimetallic thermostat disposed so that when it is unheated it will hold said low pressure valve means closed and so that it will release said low pressure differential valve means when it is heated; an electrically heated coil for heating said thermostat; and means for energizing said coil whereby said thermostat will be heated and said low pressure differential valve means released.

12. In a mechanism for controlling the flow of air from an aircraft cabin, the combination of: means forming a passage for the outlet of air from said cabin; an outwardly opening valve to control the escape of air through said passage; walls cooperating with the outer face of said valve to form a control chamber in which air pressure may act to close said valve; duct means for conducting air into and out of said control chamber; valve means for controlling the flow of air through at least one of said duct means whereby the pressure in said control chamber will be varied; control means sensitive to pressure in said control chamber for controlling the position of said valve means; differential pressure valve means connecting the interior of said control chamber with a zone connected to the ambient atmosphere; a heat responsive element for controlling the operation of said differential pressure valve means; and means for heating said heat responsive element.

FRANK E. SNEDECOR.